APPARATUS FOR THE PRODUCTION OF MAGNETIC SOUND TAPE

Filed Dec. 21, 1950 3 Sheets-Sheet 1

INVENTORS
William C. Speed
James J. Dwyer
BY
Pennie, Edmonds, Morton & Barrows
ATTORNEYS INVENTORS
William C. Speed
James J. Dudley
BY
Pennie, Edmonds, Morton & Barrows
ATTORNEYS Feb. 1, 1955 W. C. SPEED ET AL 2,700,952

APPARATUS FOR THE PRODUCTION OF MAGNETIC SOUND TAPE

Filed Dec. 21, 1950 3 Sheets-Sheet 3

INVENTORS
William C. Speed
James J. Dwyer
BY
Pennie, Edmonds, Morton & Barrows
ATTORNEYS United States Patent Office 2,700,952 Patented Feb. 1, 1955

2,700,952

APPARATUS FOR THE PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,979

14 Claims. (Cl. 118—10)

This invention relates to the production of magnetic recording tape and has for its object more particularly improvements in the method of and apparatus for coating a tape base with finely divided magnetic material.

In copending applications, Serial Nos. 201,974 and 201,975, filed December 21, 1950, simultaneously herewith, there is disclosed what may be characterized as an overall method and apparatus for producing magnetic recording tape. The tape base is shown to be processed in a succession of zones, including charging, pre-coating and pre-drying, if desired, magnetic coating, drying, magnetic monitoring, aligning, discharging, etc. The present application relates to the method and apparatus involved more especially in the magnetic coating stage.

Various tape base materials may be used, such as plastics, paper, etc., the most common being paper and cellulose acetate. Various magnetic materials may be used for the coating, the one most commonly used at the present time being very finely divided magnetic oxide of iron; not the natural magnetic oxide of iron, but one that is produced artificially because its quality can be better controlled. A dispersion of the magnetic material in a suitable vehicle or carrier is prepared, the vehicle usually carried a solvent, such as toluol, isopropyl acetate, etc. The dispersion, while free-flowing, has a viscosity conducive to the laying of a coating of given thickness on the tape base which remains substantially intact during the drying operation. The solvent is volatilized during the drying operation leaving a solid but pliable residue of the magnetic material on the tape base.

In order to facilitate and to improve adherence of the magnetic material to the tape base, the surface of the tape base to be coated with the magnetic material may be precoated with a suitable adhesive material, such as a copolymer of polybutadiene with acrylonitrile, the methyl esters of acrylic acid, etc. The magnetic material is then laid on the adhesive surface and subjected to drying.

During either or both coating operations, the tape base is passed between a bottom support and the discharge opening of a feed hopper of the coating material, so that the coating is applied to the tape base as it moves thereunder. In the magnetic coating operation, the tape base is passed horizontally through a gap between the bottom support and the feed hopper.

No matter how carefully the tape base is made or how carefully the coating operation is conducted, difficulties arise which affect the results. Thus, the tape base itself will have an occasional pimple or berry-like projection on its upper or underside, or both; or a foreign particle may be deposited on and cling to the tape base. Such obstructions interfere with the passage of the tape base through the gap. They, for example, may strike the feed hopper or the support below, resulting in a tearing of the tape base. If this should happen magnetic material will continue to be discharged from the feed hopper and will spread over the surrounding portions of the apparatus. The tearing of the tape base further complicates matters by making difficult the rejoining of the torn ends by splicing or any other manner. In practically all cases tearing of the tape base requires the coating operation to be stopped until the resulting mess is cleaned up. Even though the obstruction should pass through the gap without tearing the tape base, it may impair objectionably the quality of the magnetic coating applied to the tape base. It may, for example, prevent the deposit of a coating of uniform thickness transversely of the tape base.

Difficulties and disadvantages of the kind enumerated, as well as others, may for the most part be avoided in the practice of the present invention; as will be better understood on referring to the accompanying drawings, taken in conjunction with the following description, in which.

Figures 1, 2:
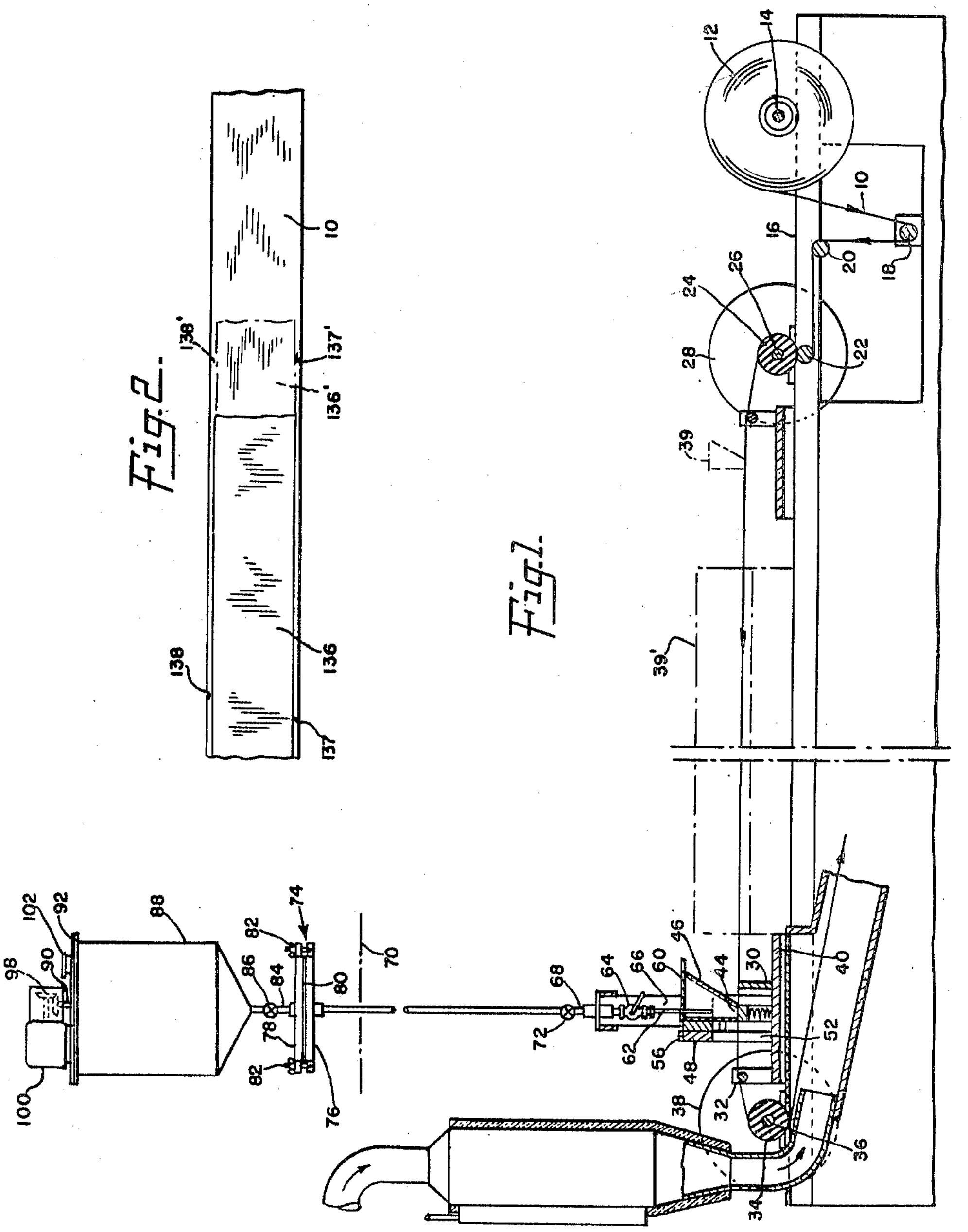
Fig. 1 is a longitudinal sectional elevation of a form of apparatus illustrative of a practice of the invention; showing in general how unprocessed tape base is fed to and passed through the magnetic coating operation while under suitable tension.
Fig. 2 is a plan view of a piece of tape base, showing uncoated and coated portions.

Referring first to Fig. 1, a tape base 10 of any suitable material, such as cellulose acetate, paper, etc., in the form of a roll 12, is mounted on a shaft 14 supported by a frame 16. The tape base extends around rollers 18, 20, 22 and 24, the latter roller being mounted on a shaft 26 terminating in a flywheel 28, a guide support 30, a guide support 32, the feed hopper being disposed between the latter two guide supports, a roller 34 mounted on a shaft 36 terminating in a flywheel 38, all of which are supported by the frame.

As already indicated, if desired the tape base may be provided with a pre-coat of suitable adhesive material, which is preferably dried in part before receiving a coat of magnetic material. Reference may be made to the above mentioned copending applications, as well as to copending application, Serial No. 201,997, filed December 21, 1950, simultaneously herewith for further details on such operations. For present purposes, general reference only is made in Fig. 1 to an adhesive precoating device 39 and a pre-coat drying device 39', both shown in dotted outline.

Figure 3:
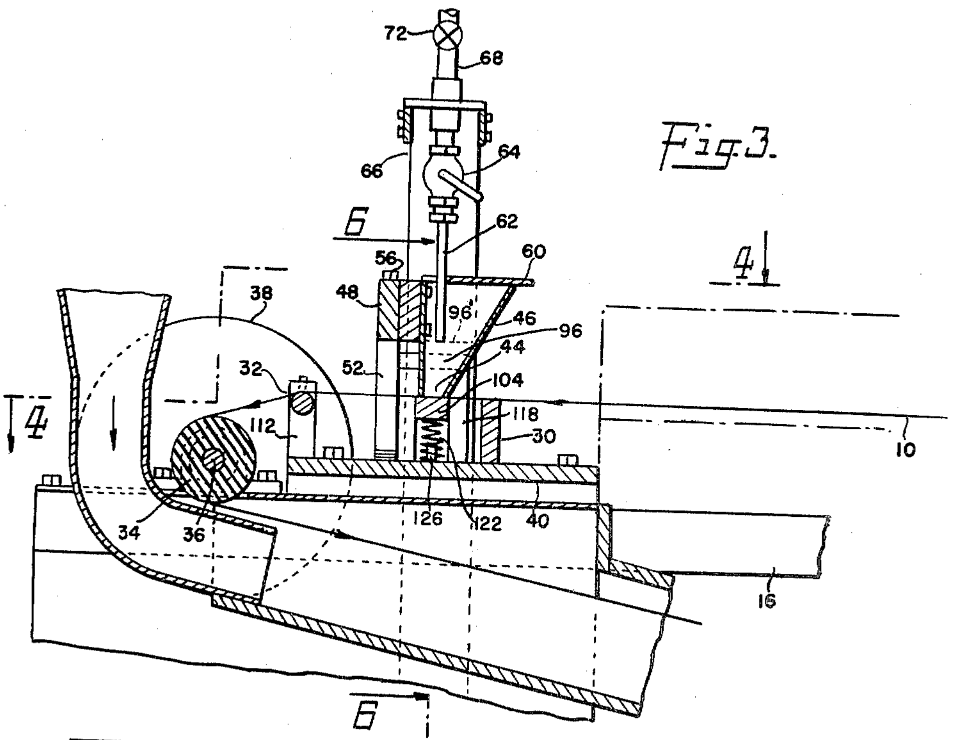
Fig. 3 is an enlarged sectional elevation, on the line 3—3 of Fig. 4, of the magnetic coating portion of the apparatus.
Figure 4:
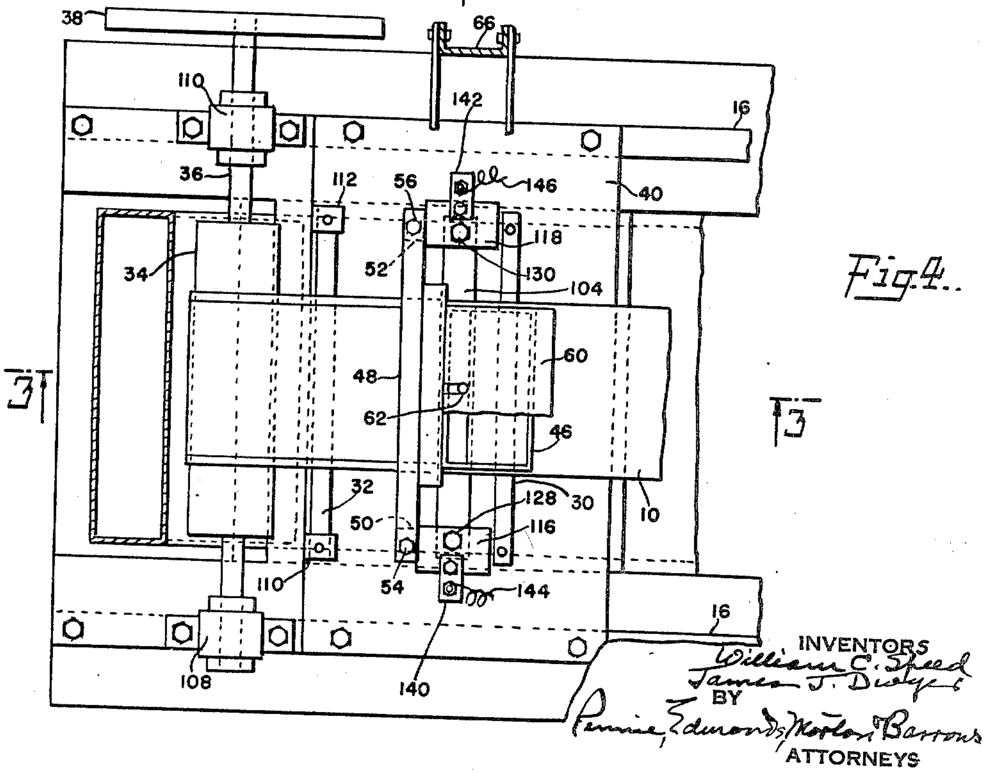
Fig. 4 is a section on the line 4—4 of Fig. 3.

Still referring to Fig. 1 and particularly to Figs. 3 and 4, it will be noted that the magnetic coating device is formed in general of a platform 40, extending across and integrally secured to the frame. Guide support 30 is integrally secured to the platform, the top of the guide support being approximately in alignment with the discharge opening 44 of a hopper 46 supported at its rear by a bracket 48; the ends of the bracket being in the form of vertical posts 50 and 52 having passageways therethrough for bolts 54 and 56 securable at their lower ends to the platform. The bolts may be suitably turned in order to place and maintain the discharge opening of the hopper at its preferred operating level. A removable cover 60 on the hopper is slotted to receive a vertically disposed lower conduit 62 with a regulating valve 64. The conduit is secured to a vertical support 66 fastened at its lower end to the frame.

Figure 5:
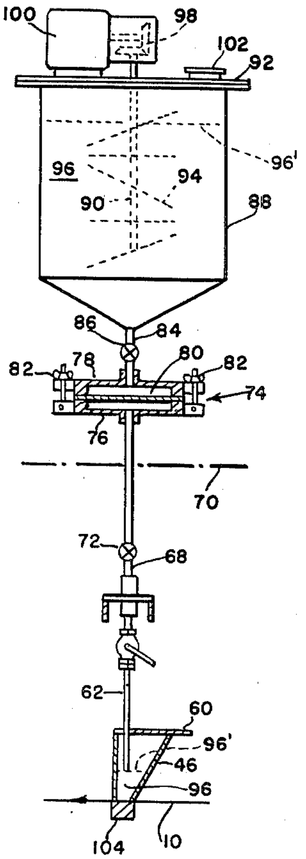
Fig. 5 is an elevation, sectional in part, of the feed hopper and its supply line.

As shown in Fig. 5 the lower conduit communicates with a second conduit 68, which in the instant construction extends through a ceiling 70 to the floor above. The second conduit with a valve 72 connects with a filter 74. While any suitable filter may be used, the current one is in the form of two juxtaposed hollow members 76 and 78 containing several layers of fabric filters 80, such as filter paper, stretched between the two hollow members. The two hollow members are non-leakably held together by a plurality of wing nuts 82. A third conduit 84, with a valve 86, connects the filter with the bottom of a stirring or mixing vessel 88 having a shaft 90 depending from its top 92; the shaft being provided with a plurality of paddles 94 and arranged at different angles to each other, in order more effectively to stir or mix magnetic coating material 96 contained therein. The upper end of the shaft extends through the top and is operatively connected with meshing gears 98 driven by a motor 100. A closable opening 102 is in the top for introducing a dispersion of magnetic material, such as magnetic oxide of iron, into the mixing vessel.

It seems that no matter how carefully the tape base is made, or processed preparatory to coating with the magnetic material, as it approaches feed hopper 46 raised or lowered portions on its upper or lower side, or both, in the form of pimples or berries, for example, are encountered which not only affect the passage of the tape base underneath the hopper, but also the sound recording and sound reproducing characteristics of the tape. If the obstruction is fairly large in size, the tape base may jam against the hopper and be torn or otherwise damaged. The tearing of the tape base at this stage leads to highly undesirable complications. The magnetic dispersion flows out of the hopper and over-runs the adjacent apparatus; the momentum of the on-coming tape base causes it to pile up; the pre-coating operation is, of course, impaired; and the entire operation must be stopped. If the obstruction does not tear the tape base, irregularities in the coating occur which greatly impair sound recording and hence sound reproduction. It is imperative that the finished tape have a magnetic coating of optimum uniform thickness.

Special means are provided, therefore, to prevent tearing of the tape base and to overcome abnormal irregularities in the coating. To this end a bottom support 104 for the tape is provided below the feed hopper, which may be said to be free-floating because it can drop sufficiently to permit the obstruction to pass underneath without tearing the tape base and to signal an operator so that he may mark promptly the affected spot for subsequent treatment, to be described below.

Figure 6:
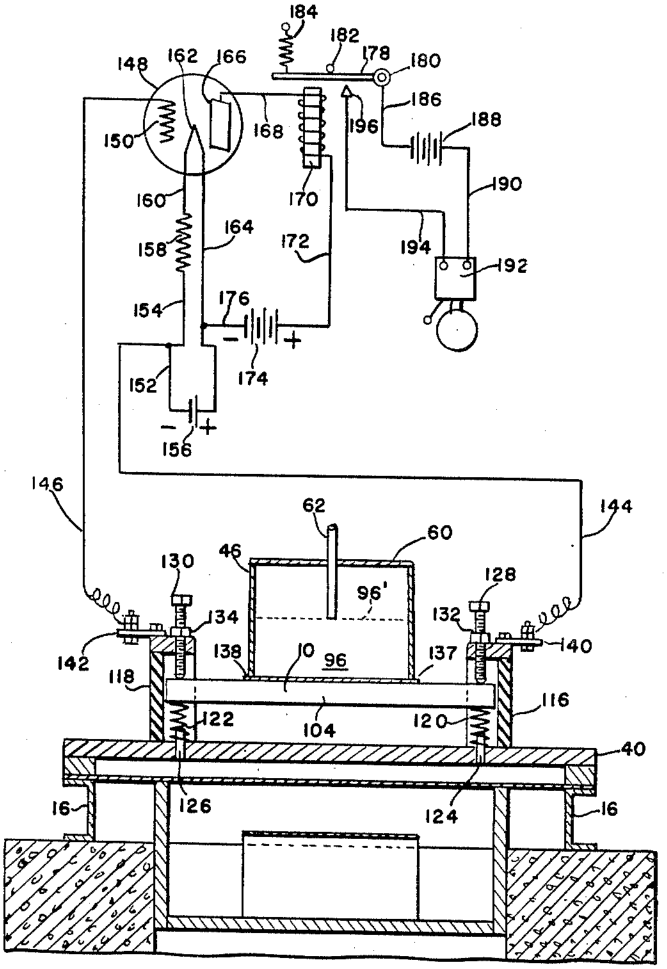
Fig. 6 is a section on the line 6—6 of Fig. 3, showing a signal or alarm system.

While Figs. 3 and 4 indicate such means, they are more fully detailed in Fig. 6. Referring first to Fig. 3, it will be noted that tape base 10 passes over the top of guide support 30 and then over adjustable bottom support 104 disposed directly below discharge opening 44 of feed hopper 46, and from there to and over guide support rod 32 and roller 34. The latter guide support extends (Fig. 4) across platform 40, being attached at its ends to vertical posts 110 and 112 secured to the platform. Guide supports 30 and 32 are about the same height and are so arranged with respect to the bottom of feed hopper 46 and bottom support 104 that a gap of predetermined minimum uniform height is provided and maintained between the top of tape base 10, or the top of bottom support 104, and the bottom of the hopper so that a coating of magnetic material of optimum thickness may be applied to the top of the tape base as it moves under the hopper.

Roller 34 is placed below the level of guide support 32 and is preferably made of such material as rubber so that it may grip the underside of the coated tape base. The roller is tightly mounted on shaft 36 mounted in journals 108 and 110, secured to the frame. Flywheel 38, as already noted, fits on the far end of the shaft. Roller 34 with its flywheel 38 and roller 24 with its flywheel 28 (Fig. 1) keep tape base 10 under tension and uniform speed, thus helping to assure optimum coating operations.

Returning to Figs. 3 and 4, bottom support 104 extends across and well beyond the ends of discharge opening 44 of feed hopper 46, intermediate a pair of open box supports 116 and 118 secured at their bottoms to the platform.

This is also brought out in Fig. 6, which will now be considered in more detail. Bottom support 104 rests at its ends on coil springs 120 and 122 held in vertical position by rods 124 and 126 secured to platform 40. Adjusting screws 128 and 130 extend downwardly through threaded holes in the tops of open box supports 116 and 118 into contact with the top of the bottom support. They are provided with lock nuts 132 and 134.

This construction permits adjustment of the bottom support with respect to the bottom of feed hopper 46 by turning the screws and lock nuts suitably, so that a gap of predetermined minimum uniform height may be provided and maintained between the top of the bottom support, or the tape base, and the bottom of the hopper, to place a magnetic coating 136 of optimum thickness on the tape base. As shown in Fig. 6 tape base 10 is slightly wider than feed hopper 46, narrow side portions 137 and 138, extending beyond the sides of the discharge opening of the hopper, which are not coated (Fig. 2); those side portions conforming in general to narrow side portions 137′ and 138′ which received no adhesive coating, if an adhesive coating 136′ is provided on the main portion of the tape base. Once such a gap (Fig. 6) is established between the hopper and the bottom support, it cannot be made smaller, unless of course the screws and lock nuts are disturbed.

But such a gap can be made larger by urging the bottom support downwardly against the coil springs. This happens when an obstruction on the tape base arrives between the bottom of the hopper and the top of the bottom support. The obstruction, no matter whether to the side or in the center of the tape base, whether single or multiple, depresses the bottom support and rides under the hopper without tearing the tape base; unless, of course, the obstruction is abnormally large, which seldom is the case.

As already stated, means are provided also to signal the operator that an obstruction has reached the hopper. While such means may take various forms, the one shown in Fig. 6 is illustrative. Being made of metal, bottom support 104, adjustable screws 128 and 130, and open box supports 116 and 118 are utilized as conductors of electrical current in a first relay having terminals 140 and 142 secured to the open box supports, the terminals in turn being connected to leads 144 and 146 in the circuit of a triode tube 148. The latter lead connects the grid 150 of the triode while the former lead terminates in two branches 152 and 154, the former being connected to the negative terminal of a battery 156, and the latter being connected to a resistance 158. A lead 160 connects the resistance with the filament 162 of the triode. The other lead 164 of the filament connects the positive terminal of the battery.

The anode plate 166 of the triode connects with a lead 168 in a second relay formed of a solenoid 170, a lead 172 connecting the coil of the solenoid with the positive terminal of a battery 174 and a lead 176 connecting the negative terminal of the battery with lead 164 connecting filament 162 with battery 156 in the other relay.

Solenoid 170 is operatively associated with a third relay formed of an arm 178 pivoted at one end 180 and normally held spaced from the solenoid by a stop 182 and a spring 184 at the other end. A lead 186 connects the arm with a battery 188. Another lead 190 connects the battery with a terminal of signal or alarm device 192, such as a bell; the other terminal being connected by a lead 194 to a terminal 196 spaced intermediate the end of solenoid 170 and arm 178.

In order briefly to illustrate the operation of the signal means just described, it may be assumed that a portion of tape base 10 approaching feed hopper 46 contains one or more obstructions, such as a blister, pimple or berry-like formation of the tape base material itself, or one or more foreign particles attached thereto. Since the coating of magnetic material on the tape base must be of substantial uniform optimum thickness, and that thickness amounts to only a few thousandths of an inch, it is apparent that the obstruction need not be very large in order to strike the bottom of the hopper, if the obstruction is on the top of the tape; or to strike the top of the bottom support, if the obstruction is on the bottom of the tape base.

It is imperative, therefore, that the mechanism employed be extremely sensitive so that the obstruction will pass between the hopper and bottom support without tearing the tape base and so that the presence of the obstruction is adequately announced without fail. Since bottom support 104 floats freely on sensitive coil springs 120 and 122, it is quickly and easily depressed to permit passage of the obstruction. Such depression of the bottom support breaks the contact between the bottom of adjusting screw 128 and the top of the bottom support, or breaks the contact between the bottom of adjusting screw 130 and the top of the bottom support, or both.

Before the break of contact between the bottom support and the adjusting screws occurs, current passes continuously through the first relay; namely, from battery 156, through branch 152, lead 154, resistance 158, lead 160, filament 162, grid 150, lead 146, adjusting screw 130, bottom support 104, adjusting screw 128, lead 144 and branch 152 to the battery. Since grid 150 and filament 162 of the triode are both negatively charged, flow of electrons from the filament to positively charged anode plate 166 is prevented, or at least effectively inhibited, due to the negative field set up around the filament by the grid.

When, however, bottom support 104 is depressed by the passing obstruction and the circuit in the first relay is broken, no current flows to the grid and it becomes neutral. The neutralized grid, therefore, no longer prevents or inhibits the passage of electrons from the filament to the plate. The negative electrons from the filament are attracted in fact by the positively charged plate.

As current passes from battery 174 through the filament and plate, solenoid 170 is energized. Magnetization of the core of the solenoid attracts or pulls arm 178 in the third relay, causing it to contact terminal 196. When this occurs current from battery 188 passes freely through the relay causing the operation of the signal or alarm device 192. In the construction shown, its bell is caused to ring, thus calling the operator's attention to the fact that an obstruction on the tape base is passing underneath the hopper.

On hearing the signal, the operator promptly inspects the coated portion of the tape base passing beyond the hopper to detect the precise location of the obstruction. He then attaches a marker on, or otherwise marks, that part of the coated tape base, usually by means of a relatively small adherent tab protruding beyond the edge of the tape base, so that the affected portion may be located easily. The affected portion is advantageously cut out by removing a transverse section of the coated tape base and splicing carefully the resulting two ends of the main tape base having a coating of the desired uniform thickness; the two ends behind joined, preferably, in an angular straight line, end to end, not overlapping, relationship—with an adhesive piece of splicing tape overlapping the two ends on the non-coated side of the tape base. Such a procedure is disclosed in copending application, Serial No. 201,987, filed December 21, 1950, simultaneously herewith, now Patent No. 2,664,139, issued December 29, 1953.

The sensitivity of the apparatus is improved when magnetic coating material 96 in hopper 46 is maintained at a given level 96'. This level advantageously is at the lower end of lower conduit 62, as shown by a dotted line in Figs. 1, 3, 5 and 6; and it may be maintained readily with the use of regulating valve 64. The maintenance of a constant amount of magnetic material in the hopper assures a substantially constant weight on tape base 10 and hence on bottom support 104 as the tape base moves under the hopper and is coated. The bottom support is then free to dip or yield when actuated solely by an obstruction on the tape base, in the manner discussed.

It will be clear to those skilled in this art that the above is only by way of illustration and that the practice of the invention readily lends itself to a number of useful modifications. For example, in the above example, the bottom support is lowered to permit passage of an obstruction on the tape base. The bottom support may be fixed and the feed hopper may be raised to obtain the same result. This may also be obtained by a dual action, namely, lowering the bottom support and raising the feed hopper. The tension of the tape base as it passes to and under the hopper is adjusted transversely while moving in its path of travel to equalize the tension across the tape base so that it is flattened out and its tendency to curl is inhibited.

It is advantageous to test the coated tape base magnetically as it moves away from the coating zone to determine whether the coating has a predetermined uniform transverse thickness and adjusting, if necessary, the distance between the moving tape base and the source of magnetic until the magnetic tests indicate that the tape base is receiving the coating of the desired uniform thickness. The magnetic tests may also be utilized to determine the quality of the magnetic material in the coating. This becomes important particularly when additional magnetic material is added to the source of supply leading to the feed hopper or when none is added but a change in quality occurs because of inadequate mixing of the dispersion before being applied to the tape base. The procedure outlined in some detail in the copending applications first mentioned above may be followed with advantage to make such determinations.

We claim:

1. In apparatus for producing magnetic sound-recording and sound-reproducing tape by passing a relatively long and narrow tape base to and through a magnetic coating machine for a coating of free-flowing magnetic material, the improvement comprising a coating machine having a feed-hopper with a horizontally disposed bottom discharge opening, a horizontally disposed tape base bottom support thereunder, tensioning means for keeping the tape base taut longitudinally as it passes over the bottom support under the feed-hopper, guide means forwardly and rearwardly of the discharge opening of the feed-hopper positioned immediately adjacent to the normal path of travel of the tape base to keep the under side of the advancing tape base normally in taut surface-to-surface sliding contact with the bottom support while keeping the upper side of the tape base normally out of contact with the feed-hopper, adjustable means for fixing and maintaining the feed-hopper and the tape base support normally at a predetermined minimum distance from one another to provide a gap for the passage therethrough of the tape base and for depositing a layer of a liquid dispersion of the free-flowing magnetic material of uniform minimum thickness onto the top surface of the tape base as it moves under tension over the support, and yielding means permitting momentary increase of the height of the gap between the support and the hopper in response to and directly by an obstruction on the tape base just far and long enough to permit the obstruction to pass between the hopper and support without serious damage to the tape base and for decreasing the height of the gap to its former predetermined minimum height as soon as the obstruction passes therethrough.

2. Apparatus according to claim 1, in which the tape base support and the hopper are adjustable with respect to each other so that the normal minimum gap between them may be increased or decreased as desired.

3. Apparatus according to claim 1, in which the tape base support is adjustable with respect to the hopper and the hopper is fixed with respect to the support so that the normal minimum gap between them may be increased or decreased as desired.

4. Apparatus according to claim 1, in which the feed-hopper is adjustable with respect to the tape base support and the support is fixed with respect to the hopper so that the normal minimum gap between them may be increased or decreased as desired.

5. Apparatus according to claim 1, in which each end of the tape base support is separately adjustable with respect to the feed-hopper so that the position of the discharge opening of the hopper with respect to the support may be controlled.

6. Apparatus according to claim 1, in which the tape base support is resiliently supported by springs, and adjusting means permit positioning of the discharge opening of the hopper with respect to the support.

7. Apparatus according to claim 1, in which the tape base support rests on compression springs, and adjusting means permit the support to be borne against the compression springs at desired pressures.

8. Apparatus according to claim 1, in which the tape base support rests at each end on a compression spring, and adjusting means are provided at each end of the support for controlling its transverse position with respect to the feed-hopper.

9. Apparatus according to claim 1, in which the feed-hopper communicates with a container for holding a supply of the magnetic material, and stirring means are provided in the container for keeping the magnetic particles widely dispersed throughout its vehicle.

10. Apparatus according to claim 1, in which a signal device permits the initiation of a signal when an obstruction on the tape base enters the coating zone so that a marker may be placed at the area affected.

11. Apparatus according to claim 1, in which a gripping roller is located forward of and a second gripping roller is located rearward of the feed-hopper in the path of travel of the tape base to keep the tape base under tension as it undergoes coating.

12. Apparatus according to claim 1, in which a signal device permits the giving of a signal when the height of the gap between the feed-hopper and the bottom support is increased over the fixed minimum height to pass the obstruction.

13. Apparatus according to claim 1, in which an electrically operated signal device is in a closed circuit with the movable member of the bottom support and feed-hopper when the gap is in its normally fixed minimum height; circuit breaking means are associated with the movable member for breaking the circuit when the height of the gap is increased to pass the obstruction; and signal means are associated with the circuit for giving a signal when the circuit is broken.

14. Apparatus according to claim 1, in which an electrically operated signal device is in a closed circuit with the bottom support when the gap is at its normally fixed minimum height; circuit breaking means are associated with the bottom support for breaking the circuit when the height of the gap is increased to pass the obstruction; and signal means are associated with the circuit for giving a signal when the circuit is broken.

References Cited in the file of this patent

UNITED STATES PATENTS

| | | |
|---|---|---|
| Re. 11,997 | Thomson et al. | May 27, 1902 |
| 1,422,545 | Dayton | July 11, 1922 |
| 1,771,388 | Nash | July 22, 1930 |
| 1,871,790 | Hansen | Aug. 16, 1932 |
| 1,961,025 | Wickham | May 29, 1934 |
| 1,989,268 | Case et al. | Jan. 29, 1935 |
| 1,997,897 | Conley | Apr. 16, 1935 |
| 2,149,307 | Nash | Mar. 7, 1939 |
| 2,190,766 | Bennett | Feb. 20, 1940 |
| 2,314,453 | Mack et al. | Mar. 23, 1943 |
| 2,332,946 | St. Hilaire | Oct. 26, 1943 |
| 2,368,648 | Dulken et al. | Feb. 6, 1945 |
| 2,408,614 | Dimmick | Oct. 1, 1946 |
| 2,494,378 | Dexter | Jan. 10, 1950 |
| 2,551,329 | Klemoal | May 1, 1951 |